(12) United States Patent
Zhang et al.

(10) Patent No.: US 11,899,494 B2
(45) Date of Patent: Feb. 13, 2024

(54) FLEXIBLE DISPLAY MODULE AND FLEXIBLE DISPLAY DEVICE (71) Applicant: WUHAN CHINA STAR OPTOELECTRONICS SEMICONDUCTOR DISPLAY TECHNOLOGY CO., LTD., Hubei (CN)

(72) Inventors: Zhuo Zhang, Hubei (CN); Xiaoqian Ma, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 340 days.

(21) Appl. No.: 17/292,437

(22) PCT Filed: Mar. 31, 2021

(86) PCT No.: PCT/CN2021/084510
§ 371 (c)(1),
(2) Date: May 9, 2021

(87) PCT Pub. No.: WO2022/188221
PCT Pub. Date: Sep. 15, 2022

(65) Prior Publication Data
US 2022/0291713 A1  Sep. 15, 2022

(30) Foreign Application Priority Data
Mar. 12, 2021 (CN) .......................... 202110271942.3

(51) Int. Cl.
*G06F 1/16* (2006.01)

(52) U.S. Cl.
CPC .......... *G06F 1/1624* (2013.01); *G06F 1/1652* (2013.01)

(58) Field of Classification Search
CPC ............................. G06F 1/1624; G06F 1/1652
See application file for complete search history.

(56) References Cited

U.S. PATENT DOCUMENTS 10,194,543 B2 * 1/2019 Seo ...................... G06F 1/1626
10,880,417 B1 * 12/2020 Song ..................... G06F 1/1652
(Continued)

FOREIGN PATENT DOCUMENTS

CN  104980545 A  10/2015
CN  105723818 A  6/2016
(Continued)

*Primary Examiner* — Rockshana D Chowdhury
(74) *Attorney, Agent, or Firm* — The Roy Gross Law Firm, LLC; Roy Gross (57) ABSTRACT

A flexible display module and a flexible display device are disclosed in the present disclosure. A housing of the flexible display module defines a sliding groove, a support component is configured to attached to the flexible display panel, a protrusion is provided on the support component, and the protrusion is located in the sliding groove. Based on the cooperation of the protrusion and the sliding groove, a gap is maintained between the flexible display panel and the cover plate during a sliding process, so as to alleviate technical problems of abrasion and unsmooth sliding of a flexible screen in an existing flexible display device.

20 Claims, 5 Drawing Sheets

(56) References Cited

U.S. PATENT DOCUMENTS

| | | | |
|---|---|---|---|
| 11,051,413 B2* | 6/2021 | Yang | ..................... G06F 1/1624 |
| 2017/0287385 A1 | 10/2017 | Lian | |
| 2019/0305237 A1* | 10/2019 | Shin | ....................... H10K 59/12 |
| 2020/0348726 A1 | 11/2020 | Han et al. | |
| 2021/0103314 A1* | 4/2021 | Ko | ........................ G06F 1/1624 |
| 2022/0221907 A1* | 7/2022 | Cai | ....................... G06F 1/1624 |
| 2022/0240400 A1* | 7/2022 | Zhou | ...................... G09F 9/301 |
| 2022/0308631 A1* | 9/2022 | Sun | ....................... G06F 1/1652 |

FOREIGN PATENT DOCUMENTS

| | | |
|---|---|---|
| CN | 108230907 A | 6/2018 |
| CN | 108766247 A | 11/2018 |
| CN | 208386626 U | 1/2019 |
| CN | 109360499 A | 2/2019 |
| CN | 109981854 A | 7/2019 |
| CN | 110164315 A | 8/2019 |
| CN | 110232869 A | 9/2019 |
| CN | 110649058 A | 1/2020 |
| CN | 110649087 A | 1/2020 |
| CN | 111968503 A | 11/2020 |
| CN | 111970392 A | 11/2020 |
| CN | 112466217 A | 3/2021 |

* cited by examiner

FLEXIBLE DISPLAY MODULE AND FLEXIBLE DISPLAY DEVICE

FIELD OF INVENTION

The present application relates to the field of display technologies, and in particular to a flexible display module and a flexible display device.

BACKGROUND OF INVENTION

With the increasing demand for mobile phone screens, full screens have become an inevitable trend. However, some internal components, such as front-facing cameras of mobile phones and face recognition sensors, occupy display areas of screens, resulting in parts of display screens missing, which cannot achieve a real full screen.

The emergence of camera under panel (CUP) technology has alleviated the problem. Digging holes is omitted in the CUP technology. Light can be transmitted and images can be formed in the CUP area. However, a light transmission effect of the current CUP technology is just mediocre, and there are problems such as unclear camera imaging and insensitive sensor sensing. In addition, the appearance of the screen component area is inconsistent with other areas, and the costs are high.

Thus, flexible display devices with full screens based on sliding technologies of the flexible screens came into being. The flexible screen under a cover plate of the flexible display device can be driven by a drive mechanism to slide around the rollers at both ends, and the free switching between a full screen display state and a turn-on functional mode (such as using a camera to take pictures) can be realized by the sliding of the flexible screen. However, when the flexible screen slides, the friction between the flexible screen and the cover plate can easily cause the abrasion of the surface of the flexible screen and unsmooth sliding.

Therefore, the existing flexible display device has the technical problems of the abrasion of the flexible screen and unsmooth sliding, which needs to be solved.

SUMMARY OF INVENTION

Technical Problems

The present disclosure provides a flexible display module and a flexible display device, so as to alleviate the technical problems of abrasion and unsmooth sliding of the flexible screen in an existing flexible display device.

Technical Solutions

In order to solve the above problems, the technical solutions provided by the present disclosure are as follows:

An embodiment of the present disclosure provides a flexible display module, including a housing, a cover plate, rolling components, a flexible display panel and a support component. The housing includes side walls and a housing bottom, wherein the housing bottom is formed with an opening in a display area, the side walls and the housing bottom form an accommodating cavity, and a sliding groove is defined by the side walls; the cover plate matches the opening of the housing bottom; the rolling component is disposed in the accommodating cavity, and is fixedly connected to two opposite ones of the side walls; the flexible display panel includes a first bending area, a second bending area, and the display area, wherein the first bending area and the second bending area are arranged around the rolling component, so that the flexible display panel slides in the accommodating cavity, and a gap is formed between the flexible display panel and the cover plate; and the support component is configured to be attached to the flexible display panel, wherein at least one area of the support component is provided with a protrusion along a width direction of the flexible display panel, and the protrusion is located in the sliding groove for maintaining a gap between the flexible display panel and the cover plate during a sliding process.

In the flexible display module provided by the embodiment of the present disclosure, the support component is provided with hollow portions on positions corresponding to the first bending area and the second bending area.

In the flexible display module provided by the embodiment of the present disclosure, a shape of the hollow portions includes at least one of a square hole, a round hole, a convex elongated shape, and a concave elongated shape.

In the flexible display module provided by the embodiment of the present disclosure, the support component is not provided with a protrusion on positions corresponding to the first bending area and the second bending area.

In the flexible display module provided by the embodiment of the present disclosure, the sliding groove is discontinuous.

In the flexible display module provided by the embodiment of the present disclosure, a length of the support component is equal to or greater than a length of the flexible display panel.

In the flexible display module provided by the embodiment of the present disclosure, the flexible display module further comprises a functional element, and the functional element is disposed on a side of the flexible display panel away from the cover plate, and is fixedly connected to the housing.

In the flexible display module provided by the embodiment of the present disclosure, the flexible display panel further includes a hole defined in the first bending area, and the hole is configured to expose the functional element when the flexible display panel slides to a specific position.

In the flexible display module provided by the embodiment of the present disclosure, the hole penetrates the support component.

In the flexible display module provided by the embodiment of the present disclosure, the hole and one of the hollow portions at least partially overlap.

In the flexible display module provided by the embodiment of the present disclosure, lengths of the first bending area and the second bending area are equal to a sliding distance when the flexible display panel slides to a specific position.

In the flexible display module provided by the embodiment of the present disclosure, each of the rolling components includes a roller.

In the flexible display module provided by the embodiment of the present disclosure, a lubricating layer is provided in the gap between the flexible display panel and the cover plate.

In the flexible display module provided by the embodiment of the present disclosure, the lubricating layer is coated on a surface of the flexible display panel and/or a surface of the cover plate.

In the flexible display module provided by the embodiment of the present disclosure, material of the lubricating layer includes at least one of transparent optical glue and transparent grease.

In the flexible display module provided by the embodiment of the present disclosure, the support component is attached to a side of the flexible display panel away from the cover plate.

In the flexible display module provided by the embodiment of the present disclosure, the support component includes a stainless steel film.

In the flexible display module provided by the embodiment of the present disclosure, the support component is attached to a side of the flexible display panel facing the cover plate.

In the flexible display module provided by the embodiment of the present disclosure, the support component includes ultra-thin glass.

An embodiment of the present disclosure also provides a flexible display device, which includes the flexible display module of one of the foregoing embodiments.

Beneficial Effect

The flexible display module and the flexible display device provided in the present disclosure are provided with a support component. The support component may be an original film layer in the laminated structure or a newly added film layer in the laminated structure of the flexible display panel. Hollow portions are provided on the positions corresponding to the bending area of the support component, thereby improving the bending resistance of the support component. The support component is provided with a protrusion along the width direction of the flexible display panel, and the protrusion matches the sliding groove on the side wall of the housing, and can slide in the sliding groove, so as to guide and limit the sliding of the flexible display panel, improve smoothness, maintain a gap between the flexible display panel and the cover plate, and reduce friction. Moreover, the length of the support component can be greater than the length of the flexible display panel, so that the matching length between the support component and the sliding groove is increased, and the guiding is stable. In addition, a lubricating layer with excellent optical properties is provided in the gap between the flexible display panel and the cover plate, to enhance the imaging effect of the screen. Moreover, the lubricating layer with thermal conductivity characteristics improves the heat dissipation effect of the screen.

DESCRIPTION OF DRAWINGS

In order to describe embodiments of the present disclosure or technical solutions in the prior art more clearly, accompanying drawings required for describing the embodiments or the prior art will be simply explained as below. Apparently, the accompanying drawings for the following description are only some embodiments of the present disclosure. Those skilled in the art also could derive other accompanying drawings from these accompanying drawings without making a creative work.

DETAILED DESCRIPTION OF PREFERRED EMBODIMENTS

The description of the following embodiments refers to the attached drawings to illustrate specific embodiments that can be implemented in the present disclosure. The directional terms mentioned in the present disclosure, such as upper, lower, front, back, left, right, inner, outer, side, etc., are only directions referring to the accompanying drawings, so that the used directional terms are used to describe and understand the present disclosure, but the present disclosure is not limited thereto. In the drawings, units with similar structures are indicated by the same reference numerals. In the drawings, for clear understanding and ease of description, the thickness of some layers and regions are exaggerated. That is, the size and thickness of each component shown in the drawings are arbitrarily shown, but the present disclosure is not limited thereto.

Figure 1:
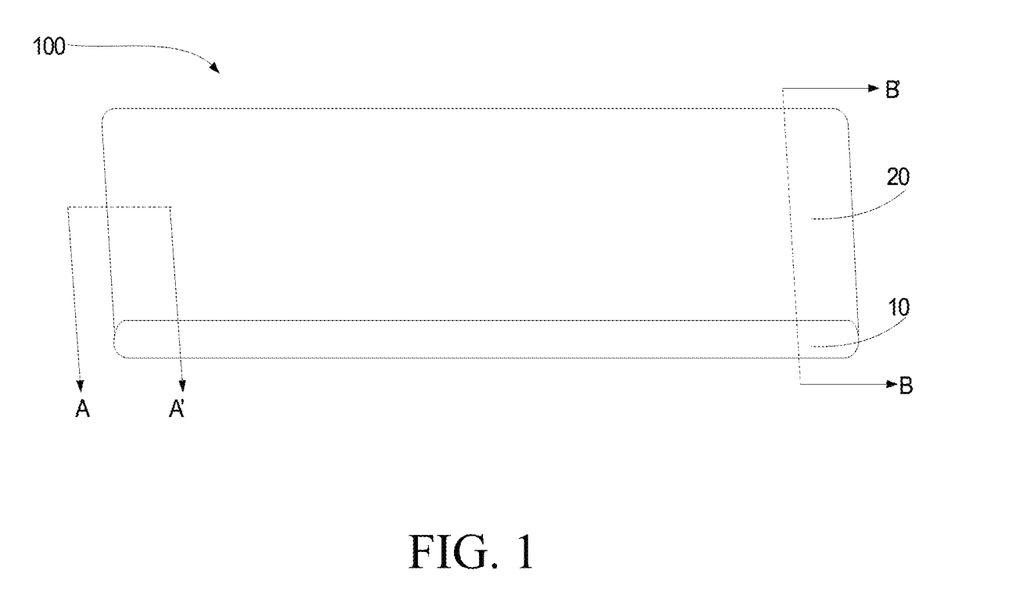
FIG. 1 is a schematic diagram of the overall structure of the flexible display module provided by an embodiment of the present disclosure.
Figure 2:
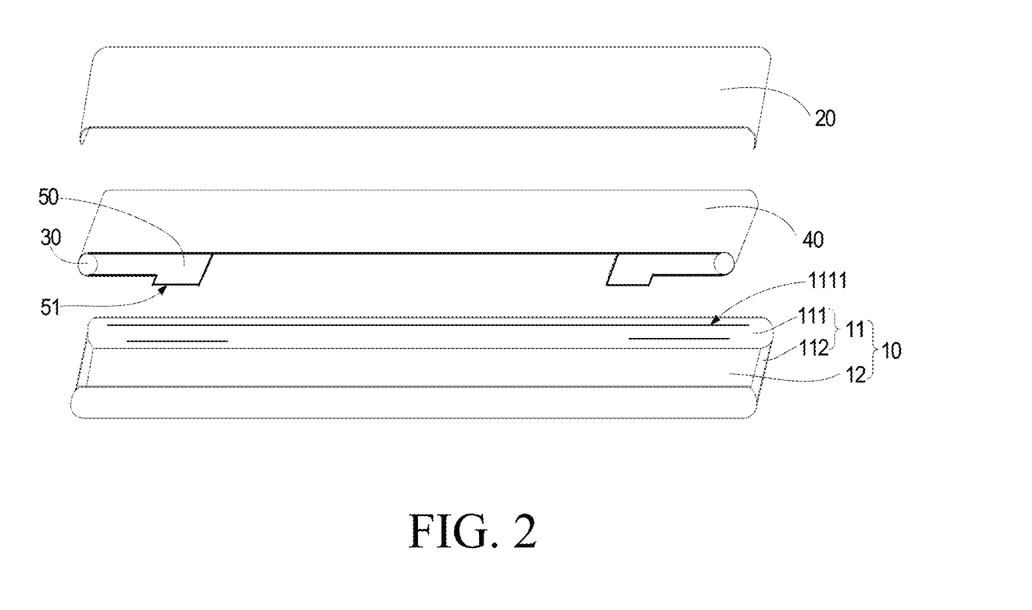
FIG. 2 is a schematic diagram of an exploded structure of the flexible display module provided by an embodiment of the present disclosure.
Figure 3:
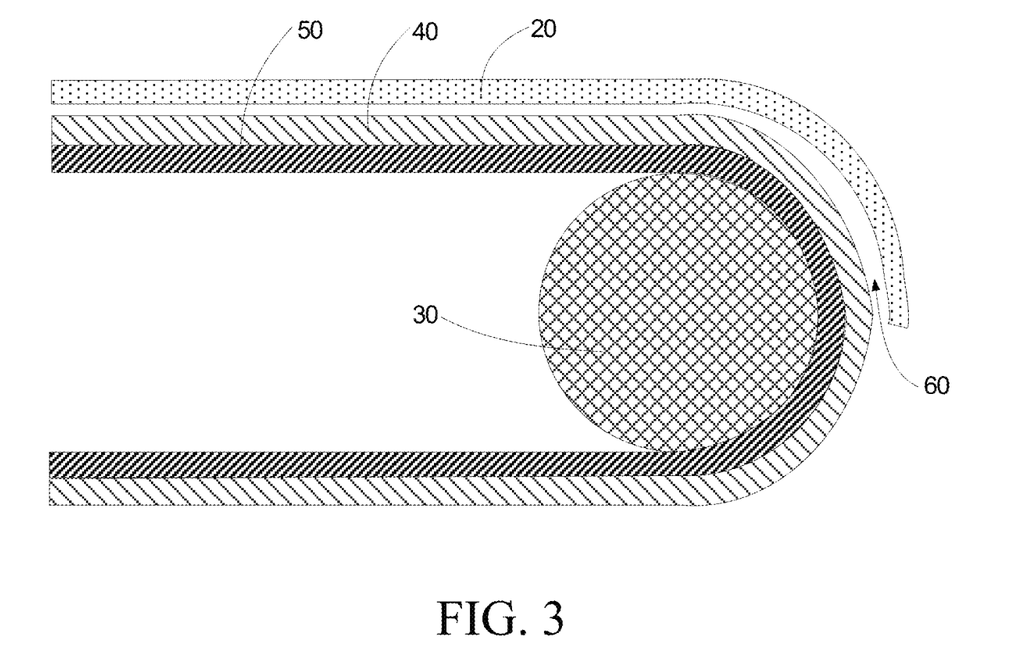
FIG. 3 is a schematic cross-sectional structure view along the A-A direction in FIG. 1.
Figure 4:
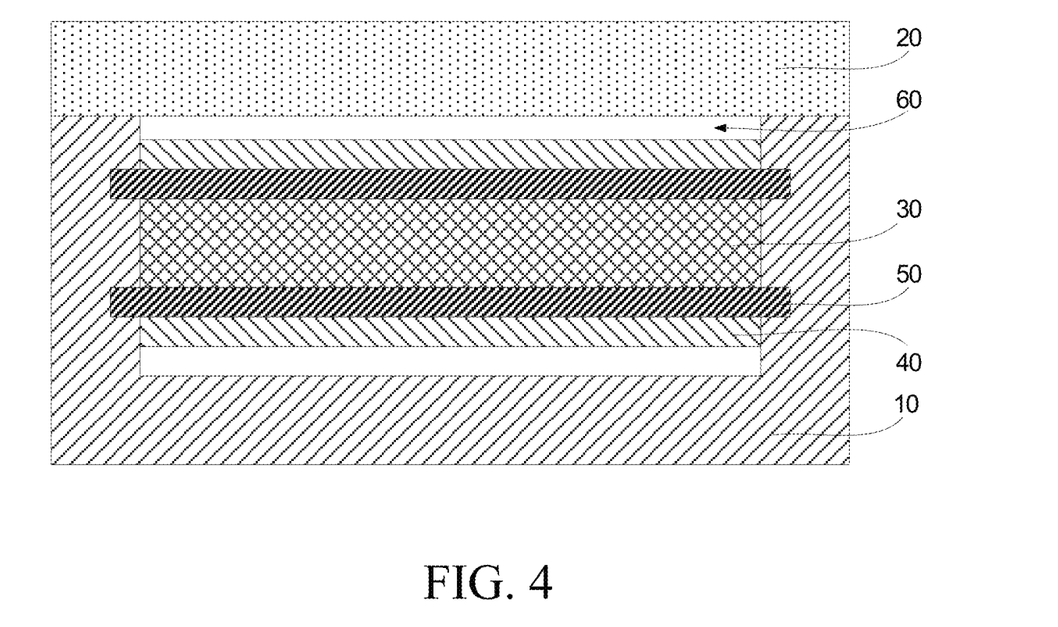
FIG. 4 is a schematic cross-sectional structure view along the B-B direction in FIG. 1.
Figure 5:
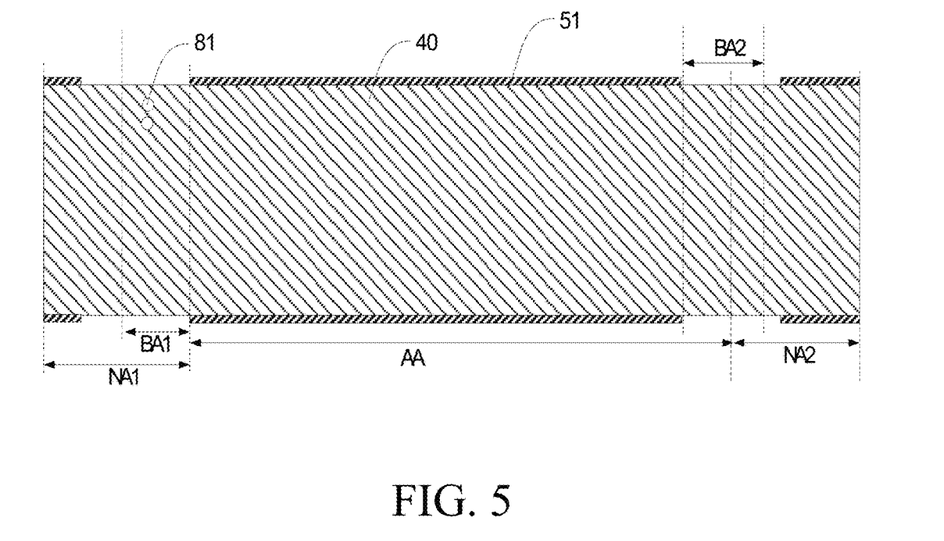
FIG. 5 is a first schematic top view of the unfolded flexible display panel provided by an embodiment of the present disclosure.
Figure 6:
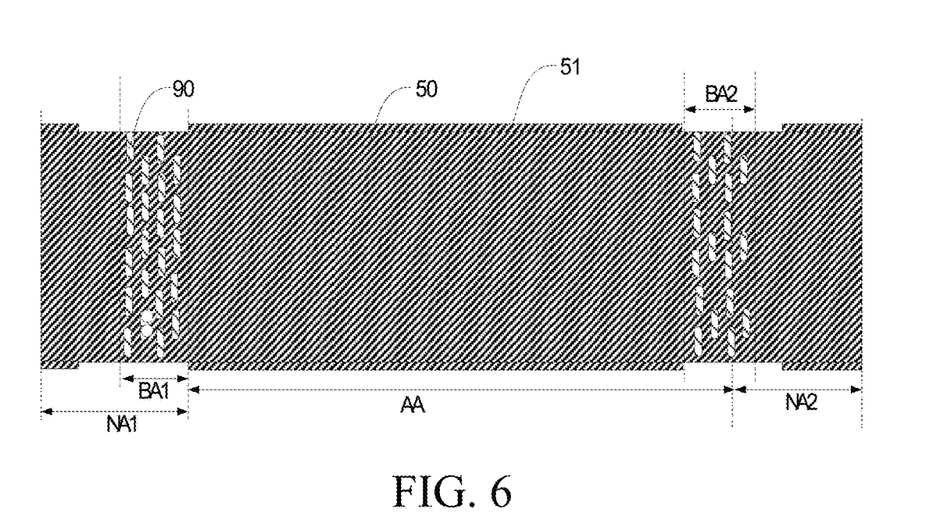
FIG. 6 is a first schematic bottom view of the unfolded flexible display panel provided by an embodiment of the present disclosure.

FIG. 1 is a schematic diagram of the overall structure of the flexible display module provided by an embodiment of the present disclosure. FIG. 2 is a schematic diagram of an exploded structure of the flexible display module provided by an embodiment of the present disclosure. FIG. 3 is a schematic cross-sectional structure view along the A-A direction in FIG. 1. FIG. 4 is a schematic cross-sectional structure view along the B-B direction in FIG. 1. FIG. 5 is a first schematic top view of the unfolded flexible display panel provided by an embodiment of the present disclosure. FIG. 6 is a first schematic bottom view of the unfolded flexible display panel provided by an embodiment of the present disclosure. Please refer to FIG. 1 to FIG. 6. The flexible display module 100 provided by the embodiment of the present disclosure includes a housing 10, a cover plate 20, rolling components 30, a flexible display panel 40, and a support component 5.

As shown in FIG. 2, the housing 10 includes side walls 11 and a housing bottom 12, the housing bottom 12 is formed with an opening in the display area, the side walls 11 and the housing bottom 12 form an accommodating cavity, and a sliding groove 1111 is defined by the side walls 11.

A cover plate 20 matches the opening of the housing bottom 12. The rolling components 30 are disposed in the accommodating cavity, and are fixedly connected to two opposite ones of the side walls 11. A flexible display panel 40 includes a first bending area BA1, a second bending area BA2, and a display area AA, wherein the first bending area BA1 and the second bending area BA2 are arranged around the rolling components 30, so that the flexible display panel 40 slides in the accommodating cavity, and a gap 60 is formed between the flexible display panel 40 and the cover plate 20.

The support component 50 is configured to be attached to the flexible display panel 40, wherein at least one area of the support component 50 is provided with a protrusion 51 along a width direction of the flexible display panel 40, and the protrusion 51 is located in the sliding groove 1111 for maintaining a gap 60 between the flexible display panel 40 and the cover plate 20 during a sliding process.

Specifically, material of the housing 10 may be one of plastic, metal, tempered glass, etc. A shape of the housing 10 may be different shapes according to actual product requirements. In the present disclosure, the housing 10 is a rectangular groove structure as an example.

Please refer to FIG. 2. The housing 10 includes a housing bottom 12 and four side walls 11, the housing bottom 12 and the four side walls 11 form an accommodating cavity, the housing bottom 12 is formed with an opening in the display area AA, and the cover plate 20 matches the opening formed by the housing bottom 12, so that the cover plate 20 and the housing 10 are closely attached mutually to form a closed space. Thus, the flexible display panel 40 and components disposed in the accommodating cavity of the housing 10 are well protected and waterproof.

The four side walls 11 include two opposite long side walls 111 and two opposite short side walls 112. The long side walls 111 and the short side walls 112 may be of equal or unequal height. For example, a height of the long side walls 111 is greater than a height of the short side walls 112, so that a cover plate 20 with curved ends at both ends may be closely attached to the housing 10, and the cover plate 20 may be a glass cover plate with high light transmittance such as 2.5D glass (cover glass, CG).

The rolling components 30 and a flexible display panel 40 are disposed in the accommodating cavity of the housing 10. The rolling component 30 includes a roller and other rollable structural components. Two ends of the rolling component 30 are respectively fixed on the two opposite long side walls 111 and are close to the short side walls 112. Two ends of the rolling component 30 are fixed, and the middle part thereof can slide. Both ends of the flexible display panel 40 surround the rolling component 30 and can slide through the rolling component 30.

Please refer to FIG. 5. The flexible display panel 40 includes a display area AA and a non-display area, the non-display area is located on opposite ends of the display area AA. The display area AA is used for displaying images, and the non-display area includes a first non-display area NA1 and a second non-display area NA2.

The flexible display panel 40 further has a bending area surrounding the rolling components 30. The bending area includes a first bending area BA1 and a second bending area BA2. The first bending area BA1 is located in the first non-display area NA1, the second bending area BA2 is located in part of the display area AA and the second non-display area NA2, and a length of the first bending area BA1 is equal to a length of the second bending area BA2.

The first bending area BA1 and the second bending area BA2 surround the rolling components 30 and can slide around the rolling components 30, so that the flexible display panel 40 slides in the accommodating cavity, and a gap 60 is formed between the flexible display panel 40 and the cover plate 20.

It should be noted that a length of each component and each region mentioned in the present disclosure refers to a size of each component and each region in a direction parallel to the long side walls 111 of the housing 10. For example, the length of the first bending area BA1 refers to the size of the first bending area BA1 in the flat state in a direction parallel to the long side walls 111 of the housing 10.

Figure 7:
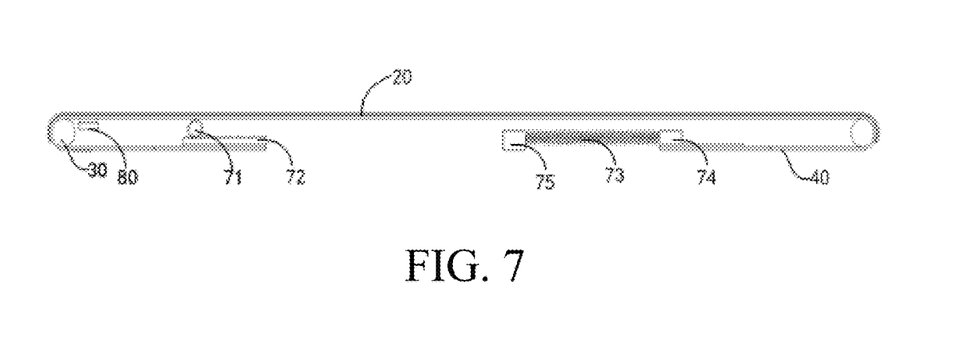
FIG. 7 is a schematic diagram of the sliding principle of the flexible display panel provided by an embodiment of the present disclosure.

FIG. 7 is a schematic diagram of the sliding principle of the flexible display panel provided by an embodiment of the present disclosure. To render the first bending area BA1 and the second bending area BA2 sliding around the rolling components 30, it is further necessary to provide the flexible display panel 40 with a sliding force. As shown in FIG. 7, the flexible display module 100 in the above embodiment further includes a connecting component and a driving component.

The connecting component connects the flexible display panel 40 with the housing 10, the driving component provides a driving force to the connecting component, and the flexible display panel 40 slides through the connecting component. The connecting component may include a gear 71, a rack 72, a spring 73, etc., wherein the rack 72 may be fixedly connected to the flexible display panel 40 of the first non-display area NA1 through a bonding plate. The gear 71 matches the rack 72, and the spring 73 is connected to a first fixing block 74 and a second fixing block 75, and is fixedly connected to the flexible display panel 40 of the second non-display area NA2 through the first fixing block 74. The first fixing block 74 is fixedly connected to the flexible display panel 40, and the second fixing block 75 is fixedly connected to the housing 10.

The driving component includes a device capable of providing the driving force, such as a motor. The driving component may also be fixed on the housing 10 to provide the driving force to the gear 71, so that the gear 71 can rotate, thereby driving the rack 72 to move by the rotation of the gear 71, causing the flexible display panel 40 to slide. The spring 73 can provide a pre-tensioning force to the flexible display panel 40, so that when the flexible display panel 40 is in a non-sliding state, a surface of the flexible display panel 40 is horizontal and parallel to a surface of the cover plate 20, and there is a gap 60 therebetween.

The flexible display panel 40 can slide around the rolling components 30 through the connecting component and the driving component, so as to realize the free switching of the display state and a turn-on functional mode of the flexible display module 100.

The functional mode may be a camera, facial recognition, and other functions. To this end, the flexible display device further includes a functional element 80 and a functional area. The functional element 80 is disposed on a side of the flexible display panel 40 away from the cover plate 20. Specifically, the functional element 80 may be fixedly connected to the housing 10 and hidden on the non-light emitting side of the flexible display panel 40, without connection to the flexible display panel 40. The functional element 80 includes a camera, a sensor, and other functional elements for realizing the functional mode.

The functional area is located in the first bending area BA1, the functional area is defined with a hole 81, and the hole 81 is used to expose the functional element when the flexible display panel 40 slides to a specific position 80. The specific position means that the flexible display panel 40 is slid a fixed distance by controlling the driving component so that the hole 81 is located directly above the functional element 80, so as to enter the functional mode.

It should be noted that the display state of the flexible display module 100 refers to a full-screen display state. At this time, the spring 73 is in a stretched state to provide a pre-tensioning force to the flexible display panel 40, so that a gap 60 is formed between the flexible display panel 40 and the cover plate 20. When the function mode is turned on, for example, when the camera function needs to be called, the driving component provides the driving force to the gear 71 and the rack 72, so that the bending area of the flexible display panel 40 slides around the rolling components 30 until the hole 81 of the functional area is located directly above the functional element 80, so as to use the camera function.

When the display state is switched to the turn-on functional mode of the flexible display module 100, the spring 73 starts to contract from the stretched state, but always maintains the pre-tensioning force for the flexible display panel 40. When the turn-on functional mode is switched to the display state of the flexible display module 100, the spring 73 returns to the stretched state. In this way, functions such as camera and full screen display can be realized without digging holes in the display area AA or using CUP technology.

In addition, the connecting components such as the spring 73, the gear 71, and the rack 72 listed in the present disclosure are merely used to illustrate how to realize the sliding of the flexible display panel 40, but the manner of sliding the flexible display panel 40 is not limited to this.

Moreover, during the sliding process of the flexible display panel 40, in order to maintain a gap 60 between the flexible display panel 40 and the cover plate 20, the flexible display module 100 is further provided with a support component 50. The support component 50 is attached to the flexible display panel 40.

Specifically, the support component 50 is attached to the side of the flexible display panel 40 away from the cover plate 20, i.e., the lower surface of the flexible display panel 40. The support component 50 includes a stainless steel film, such as SUS (a type of stainless steel). The support component 50 may be an original film layer in the laminated structure of the flexible display panel 40, or a new film layer attached to the lower surface of the flexible display panel 40.

A length of the support component 50 is equal to a length of the flexible display panel 40, and at least one area of the support component 50 is provided with a protrusion 51 along the width direction of the flexible display panel 40. The width direction of the flexible display panel 40 refers to a direction parallel to the short side walls 112 of the housing 10, and correspondingly, the length direction of the flexible display panel 40 is a direction parallel to the long sidewall 111 of the housing 10.

Both the two opposite long side walls 111 of the housing 10 are defined with sliding grooves 1111, and the protrusion 51 of the support component 50 matches the sliding groove 1111 and can slide in the sliding groove 1111. The support component 50 is made of rigid material, which can support the gravity of the flexible display panel 40 in the vertical direction, and limit the flexible display panel 40, so that the gap 60 may be maintained between the flexible display panel 40 and the cover plate 20 in the vertical direction.

During the sliding process of the flexible display panel 40, the protrusion 51 and the sliding groove 1111 cooperate to guide the sliding of the flexible display panel 40, so that the gap 60 always exists between the flexible display panel 40 and the cover plate 20. Thus, the friction between the flexible display panel 40 and the cover plate 20, which causes the abrasion of the flexible display panel 40, can be prevented, thereby improving the smoothness of the sliding of the flexible display panel 40.

The protrusion 51 is specifically provided in an area other than the first bending area BA1 and the second bending area BA2. That is, the support component 50 is not provided with the protrusion 51 on a position corresponding to the first bending area BA1 and the second bending area BA2. The protrusion 51 matches the sliding groove 1111, and thus the sliding groove 1111 may be discontinuous. Certainly, the present disclosure is not limited to this. The sliding groove 1111 of the present embodiment may also be continuous.

The matching of the protrusion 51 and the sliding groove 1111 means that the width of the sliding groove 1111 is slightly larger than the thickness of the protrusion 51, which can satisfy that the protrusion 51 slides in the sliding groove 1111. The width of the sliding groove 1111 exceeding the thickness of the protrusion 51 by a large amount may result in an unstable sliding of the protrusion 51 in the sliding groove 1111, and thus the flexible display panel 40 cannot be well limited in the vertical direction.

It is understandable that when the sliding groove 1111 is discontinuously arranged, the arrangement area of the sliding groove 1111 should be larger than the arrangement area of the protrusion 51 due to the attachment between the support component 50 and the flexible display panel 40. When the flexible display panel 40 slides, the protrusion 51 of the support component 50 also needs to slide in the sliding groove 1111, and the protrusion 51 should slide back and forth a certain distance along with the flexible display panel 40, so as to realize the state switching of the flexible display panel 40.

The specific distance refers to the sliding distance of the flexible display panel 40 when the hole of the functional area reaches the specific position. The specific distance may be equal to the length of the first bending area BA1 and the second bending area BA1.

A length of an area where the sliding groove 1111 is set beyond an area where the protrusion 51 is set may be a specific distance for the flexible display panel 40 to slide. In this way, the sliding groove 1111 can also limit the flexible display panel 40 in the horizontal direction. That is, when the flexible display panel 40 performs state switching, after sliding a specific distance, the sliding of the flexible display panel 40 may not exceed a specific distance due to the discontinuous sliding groove 1111 blocking the protrusion 51, so that the sliding error that may be caused by the accuracy of the driving component when the flexible display panel 40 slides may be prevented.

Further, the support component 50 is provided with hollow portions 90 on positions corresponding to the first bending area BA1 and the second bending area BA2, so as to improve the bending resistance of the flexible display panel 40 and the support component 50 in the bending area, and to reduce the bending stress.

The hollow portions 90 may be a square hole, a round hole, or other special hole structures, such as a convex elongated shape or a concave elongated shape, etc. Certainly, since the support component 50 is attached to the lower surface of the flexible display panel 40, and during the sliding process of the flexible display panel 40, the support component 50 is located on the outside of the flexible display panel 40 and is bent inward, the bending stress can be released well by the convex and elongated shape of the hollow portions 90. Moreover, the hollow portions 90 may be arranged regularly or irregularly.

It can be understood that the lengths of the first bending area BA1 and the second bending area BA2 are equal to the specific distance that the flexible display panel 40 slides, and the hole 81 of the functional area is defined by the first bending area BA1. Certainly, the hole 81 is also defined by the support component 50 corresponding to the first bending area BA1, and penetrates the support component 50. Moreover, since the support component 50 is provided with hollow portions 90 corresponding to the first bending area BA1, the hole 81 may overlap or partially overlap one of the hollow portions 90, depending on the size and the positions of the hole 81 and the hollow portions 90.

In the present embodiment, the support component 50 is attached to the lower surface of the flexible display panel 40, and a protrusion 51 is provided on the support component 50. The protruding portion 51 matches the sliding groove 1111 on the long side wall 111 of the housing 10, and during the sliding process of the flexible display panel 40, the support component 50 can support and guide the flexible display panel 40 to slide, so that the gap 60 always exists between the flexible display panel 40 and the cover plate 20. In this way, the friction between the flexible display panel 40 and the cover plate 20, which causes the abrasion of the flexible display panel 40, can be prevented, thereby improving the smoothness of the sliding of the flexible display panel 40.

Moreover, hollow portions 90 are defined on the position corresponding to the bending area of the support component 50, thereby improving the bending resistance of the flexible display panel 40 and the support component 50.

Figure 8:
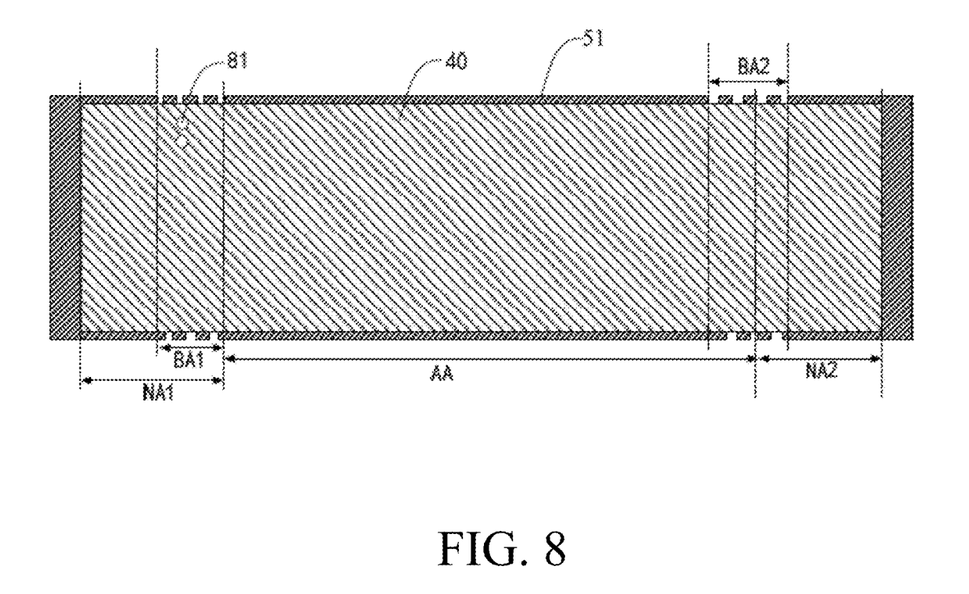
FIG. 8 is a second schematic top view of the unfolded flexible display panel provided by an embodiment of the present disclosure.
Figure 9:
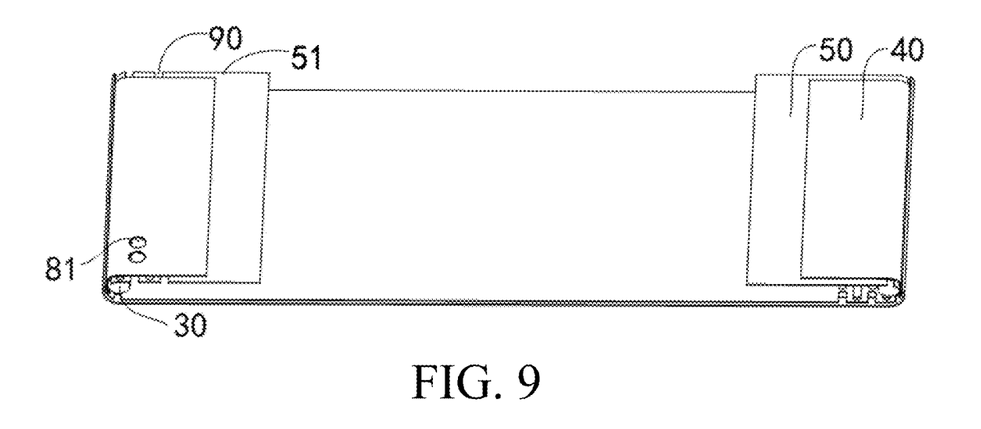
FIG. 9 is a second schematic bottom view of the unfolded flexible display panel provided by an embodiment of the present disclosure.
Figure 10:
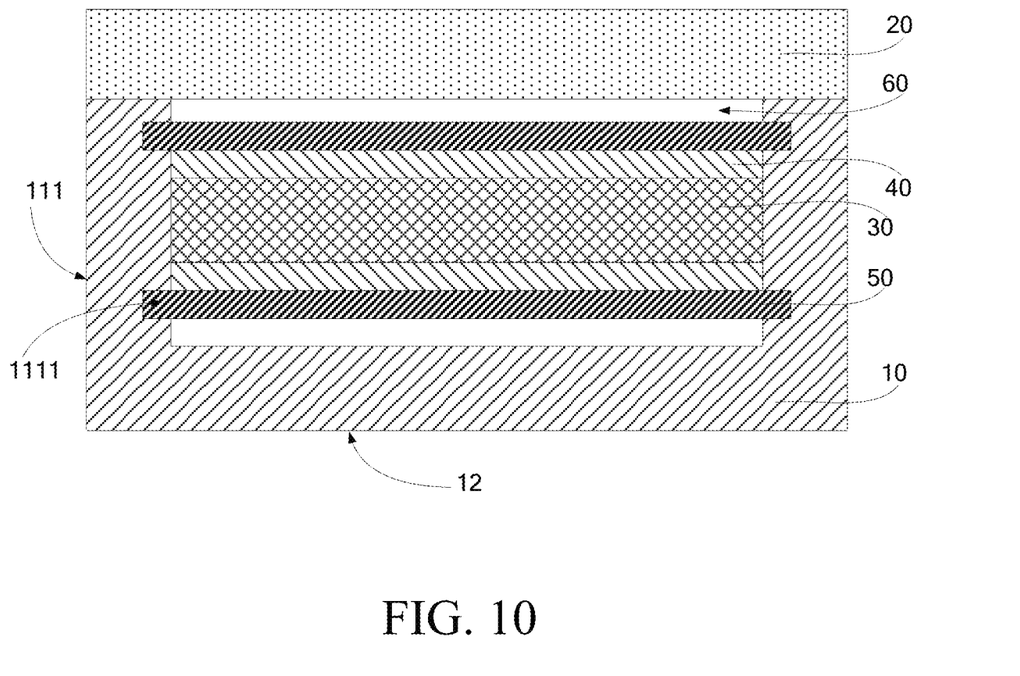
FIG. 10 is a first cross-sectional schematic diagram of the flexible display module provided by an embodiment of the present disclosure.

In an embodiment, please refer to FIGS. 8 to 10. FIG. 8 is a second schematic top view of the unfolded flexible display panel provided by an embodiment of the present disclosure. FIG. 9 is a second schematic bottom view of the unfolded flexible display panel provided by an embodiment of the present disclosure. FIG. 10 is a first cross-sectional schematic diagram of the flexible display module provided by an embodiment of the present disclosure. The difference from the above embodiment is that the support component 50 is attached to the side of the flexible display panel 40 facing the cover plate 20, i.e., the upper surface of the flexible display panel 40, and the support component 50 includes an ultra thin glass (UTG), etc.

The support component 50 may be an original film layer in the laminated structure of the flexible display panel 40, or a new film layer attached to the lower surface of the flexible display panel 40. For example, when ultra-thin glass is used as a cover window (CW) of the flexible display panel 40, the cover window can be used as the support component 50.

The support component 50 is also provided with a protrusion 51 on a position corresponding to the bending area. That is, the entire area of the support component 50 is provided with a protrusion 51 along the width direction of the flexible display panel 40. Correspondingly, the sliding groove 1111 on the long side wall 111 of the housing 10 is continuous to match the protrusion 51, so that the protrusion 51 can slide in the sliding groove 1111.

The support component 50 is made of rigid material and can limit the flexible display panel 40, so that a gap 60 is maintained between the flexible display panel 40 and the cover plate 20 in the vertical direction. During the sliding process of the flexible display panel 40, the protrusion 51 and the sliding groove 1111 cooperate to guide the sliding of the flexible display panel 40, so that a gap 60 always exists between the flexible display panel 40 and the cover plate 20. Thus, the friction between the flexible display panel 40 and the cover plate 20, which causes the abrasion of the flexible display panel 40, can be prevented, thereby improving the smoothness of the sliding of the flexible display panel 40.

Further, the length of the support component 50 is greater than the length of the flexible display panel 40, so that the matching length between the protrusion 51 and the sliding groove 1111 is increased, and the guiding for the flexible display panel 40 is stable. For other descriptions, please refer to the above-mentioned embodiment, and will not be repeated here.

Figure 11:
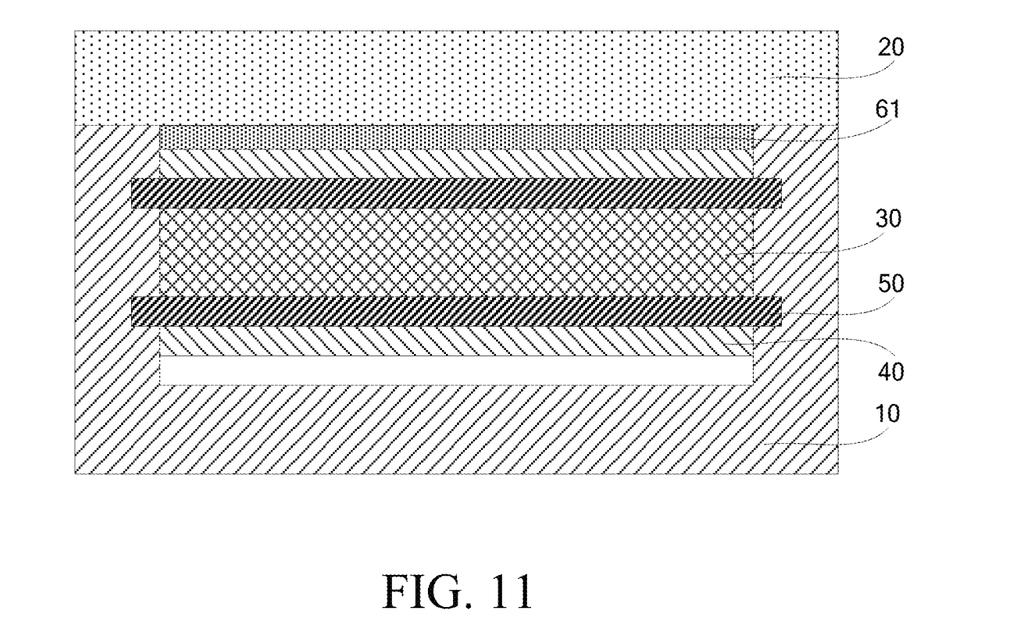
FIG. 11 is a second cross-sectional schematic diagram of the flexible display module provided by an embodiment of the present disclosure.

In an embodiment, please refer to FIGS. 4 and 11. FIG. 11 is a second cross-sectional schematic diagram of the flexible display module provided by an embodiment of the present disclosure. The difference from the above embodiment is that a lubricating layer 61 is provided in the gap 60 between the flexible display panel 40 and the cover plate 20.

The lubricating layer 61 may be coated on the surface of the flexible display panel 40 or the surface of the cover plate 20, or can be coated on the surface of the flexible display panel 40 and the surface of the cover plate 20 at the same time. The material of the lubricating layer 61 includes at least one of transparent and lubricating special substances, such as transparent optical glue and transparent grease. For example, the transparent optical glue may be OCR glue, which can be cured into fluids in different states under the irradiation of the ultraviolet light. That is, the OCR glue may be bonded to the flexible display panel 40 or the cover plate 20 through the ultraviolet curing, or can be filled in the gap 60 between the flexible display panel 40 and the cover plates 20 in a flowable state.

The material of the lubricating layer 61 not only needs to have good lubricating properties, but also needs to meet high light transmittance and a suitable refractive index. For example, the transparency is greater than 97%, and the refractive index is close to that of glass, so as to increase the light transmittance.

By filling the gap 60 between the flexible display panel 40 and the cover plate 20 with a special substance with a lubricating effect, the sliding of the flexible display panel 40 is not affected, and the imaging effect of the flexible display panel 40 is improved by the optical properties of the special substance. In addition, the heat dissipation effect of the flexible display panel 40 may also be improved by the thermal conductivity of the special substance. For other descriptions, please refer to the above-mentioned embodiment, and is not be repeated here.

An embodiment of the present disclosure further provides a display device, which includes the flexible display module 100 of one of the foregoing embodiments.

According to the above embodiments, the following effects can be known:

The present disclosure provides a flexible display module and a flexible display device. The flexible display module includes a housing, a cover plate, rolling components, a flexible display panel, and a support component. A sliding groove is defined by the side walls of the housing, and the cover plate matches with the housing bottom. The first bending area and the second bending area of the flexible display panel are arranged around the rolling components, so that the flexible display panel can slide, and a gap is formed between the flexible display panel and the cover plate. The support component may be the original film layer or a newly added film layer in the laminated structure of the flexible display panel. Hollow portions are defined on the positions corresponding to the bending area of the support component, thereby improving the bending resistance of the support component. The support component is provided with a protrusion along the width direction of the flexible display panel. The protrusion matches the sliding groove on the side walls of the housing and can slide in the sliding groove, so as to guide and limit the sliding of the flexible display panel, improve smoothness, maintain a gap between the flexible display panel and the cover plate, and reduce friction. Moreover, the length of the support component may be greater than the length of the flexible display panel, which increases the matching length between the support component and the sliding groove, so that the guiding is stable. In addition, a lubricating layer with excellent optical properties is provided in the gap between the flexible display panel and the cover plate, which enhances the imaging effect of the screen. In some other embodiments, a lubricating layer with thermal conductivity is provided in the gap between the flexible display panel and the cover plate, which improves the heat dissipation effect of the screen.

In summary, although the present disclosure has been disclosed as above in preferred embodiments, the above-mentioned preferred embodiments are not intended to limit the present disclosure. Those of ordinary skill in the art can make various changes and modifications without departing from the spirit and scope of the present disclosure. Therefore, the protection scope of the present disclosure is subject to the scope defined by the claims.

What is claimed is:

1. A flexible display module, comprising:
   a housing, including side walls and a housing bottom, wherein the housing bottom is formed with an opening in a display area, the side walls and the housing bottom form an accommodating cavity, and a sliding groove is defined by the side walls;
   a cover plate, matching the opening of the housing bottom;
   rolling components, disposed in the accommodating cavity, and fixedly connected to two opposite ones of the side walls;
   a flexible display panel, including a first bending area, a second bending area, and the display area, wherein the first bending area and the second bending area are arranged around the rolling components, so that the flexible display panel slides in the accommodating cavity, and a gap is formed between the flexible display panel and the cover plate to provide the flexible display panel sliding relative to the cover plate; and
   a support component, configured to be attached to the flexible display panel, wherein at least one area of the support component is provided with a protrusion along a width direction of the flexible display panel, and the protrusion is located in the sliding groove for maintaining a gap between the flexible display panel and the cover plate during a sliding process.

2. The flexible display module of claim 1, wherein the support component is provided with hollow portions on positions corresponding to the first bending area and the second bending area.

3. The flexible display module of claim 2, wherein a shape of the hollow portions includes at least one of a square hole, a round hole, a convex elongated shape, and a concave elongated shape.

4. The flexible display module of claim 1, wherein the support component is not provided with a protrusion on positions corresponding to the first bending area and the second bending area.

5. The flexible display module of claim 4, wherein the sliding groove is discontinuous.

6. The flexible display module of claim 1, wherein a length of the support component is equal to or greater than a length of the flexible display panel.

7. The flexible display module of claim 2, wherein the flexible display module further comprises a functional element, and the functional element is disposed on a side of the flexible display panel away from the cover plate, and is fixedly connected to the housing.

8. The flexible display module of claim 7, wherein the flexible display panel further includes a hole defined in the first bending area, and the hole is configured to expose the functional element when the flexible display panel slides to a specific position.

9. The flexible display module of claim 8, wherein the hole penetrates the support component.

10. The flexible display module of claim 9, wherein the hole and one of the hollow portions at least partially overlap.

11. The flexible display module of claim 8, wherein lengths of the first bending area and the second bending area are equal to a sliding distance when the flexible display panel slides to a specific position.

12. The flexible display module of claim 1, wherein each of the rolling components includes a roller.

13. The flexible display module of claim 1, wherein a lubricating layer is provided in the gap between the flexible display panel and the cover plate.

14. The flexible display module of claim 13, wherein the lubricating layer is coated on a surface of the flexible display panel and/or a surface of the cover plate.

15. The flexible display module of claim 14, wherein material of the lubricating layer includes at least one of transparent optical glue and transparent grease.

16. The flexible display module of claim 1, wherein the support component is attached to a side of the flexible display panel away from the cover plate.

17. The flexible display module of claim 16, wherein the support component includes a stainless steel film.

18. The flexible display module of claim 1, wherein the support component is attached to a side of the flexible display panel facing the cover plate.

19. The flexible display module of claim 18, wherein the support component includes ultra-thin glass.

20. A flexible display device, comprising: the flexible display module according to claim 1.

* * * * *